Sept. 28, 1948.　　F. H. WINSLOW ET AL　　2,450,262
REVERSING DRIVE MECHANISM
Filed May 26, 1947　　3 Sheets-Sheet 1
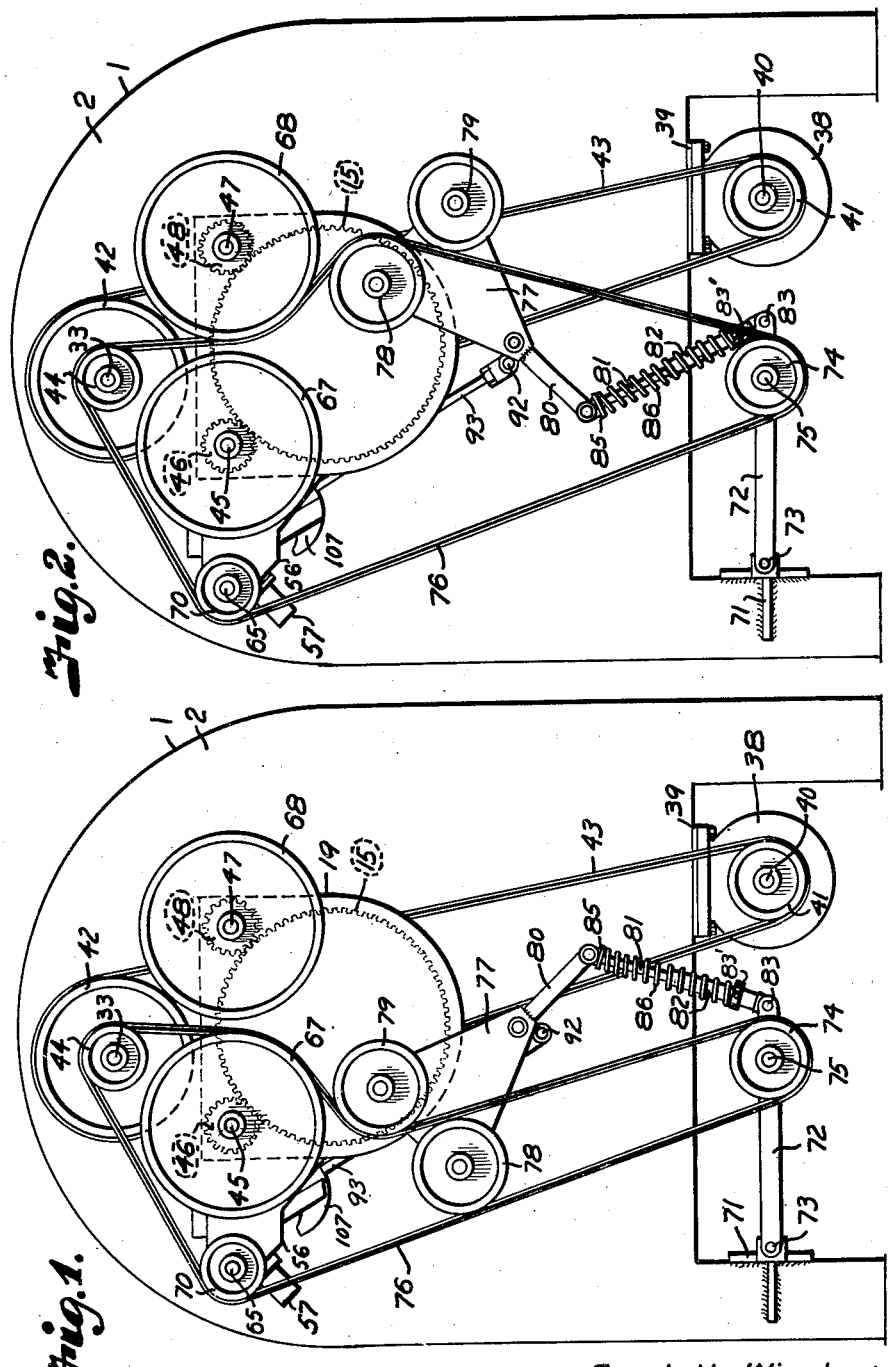
Inventor
Fred H. Winslow and
William S. Hammond
By
Fishburn & Mullendore
Attorneys

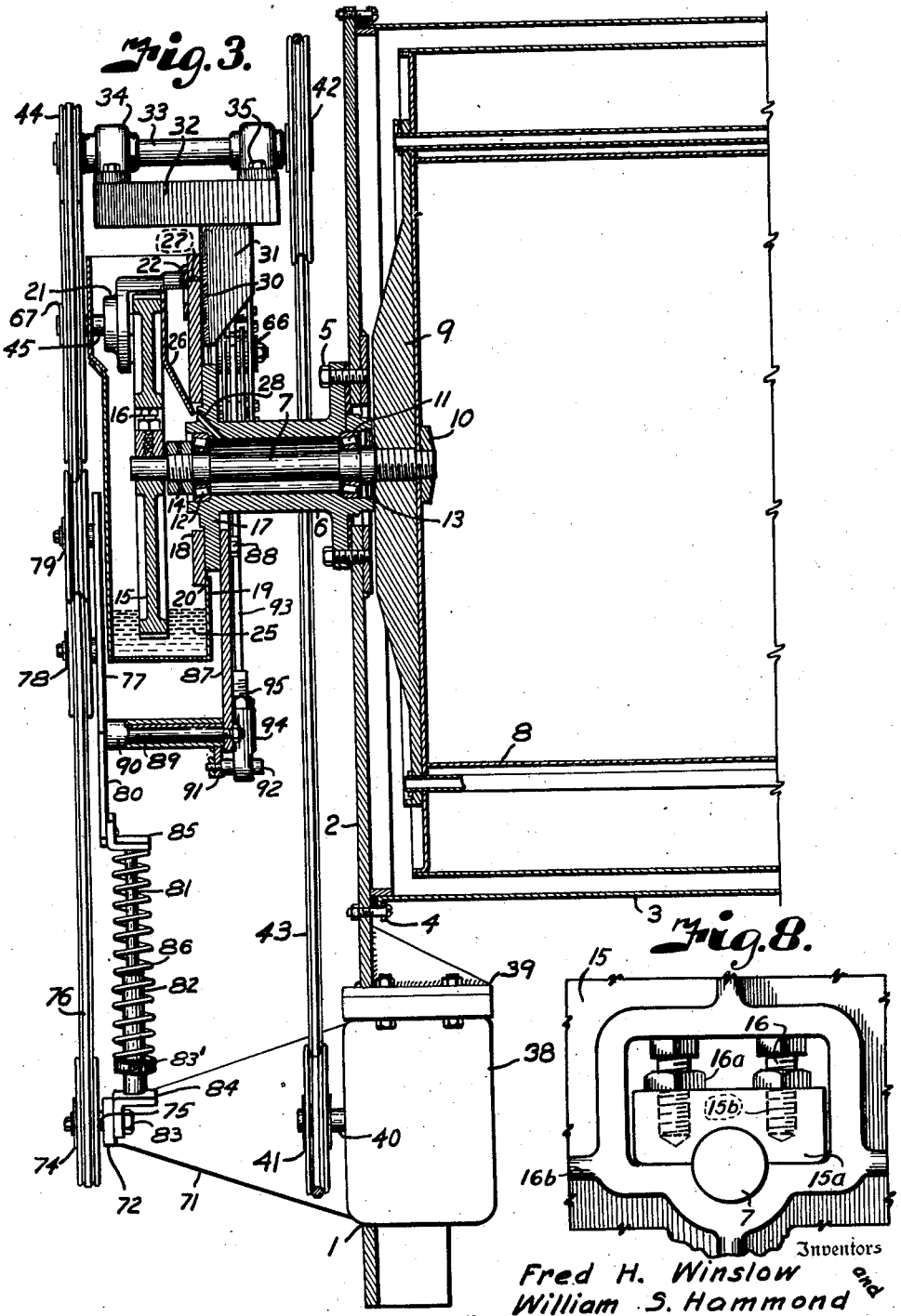

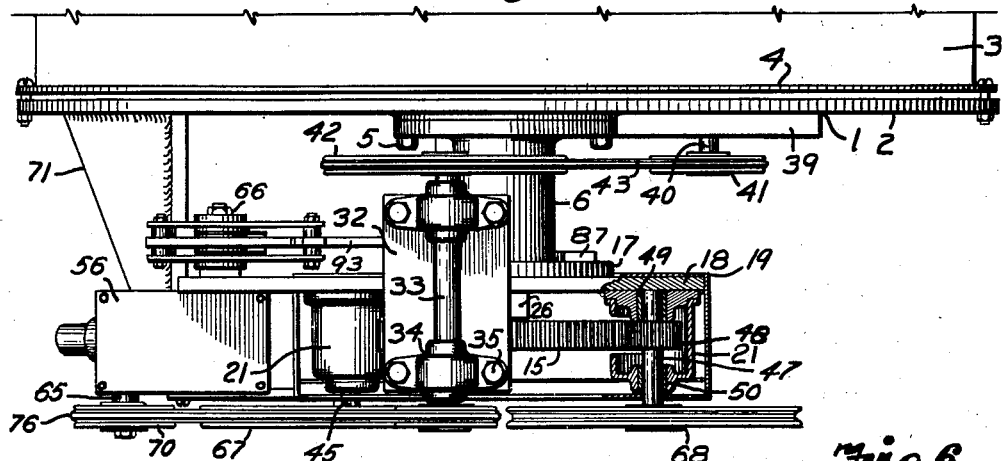
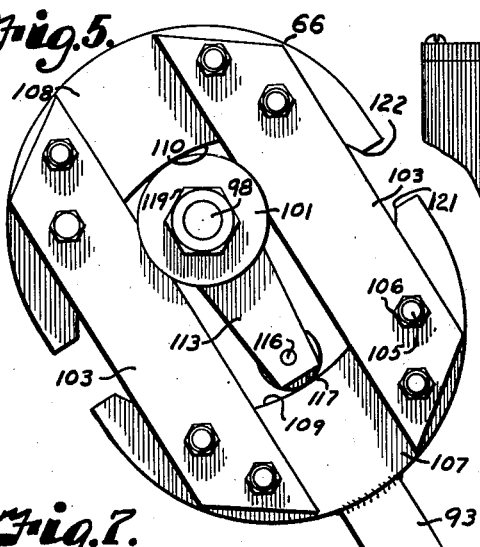
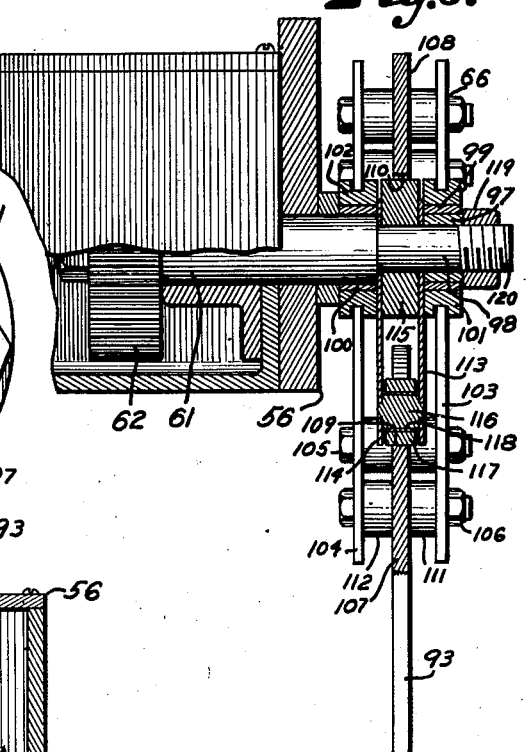
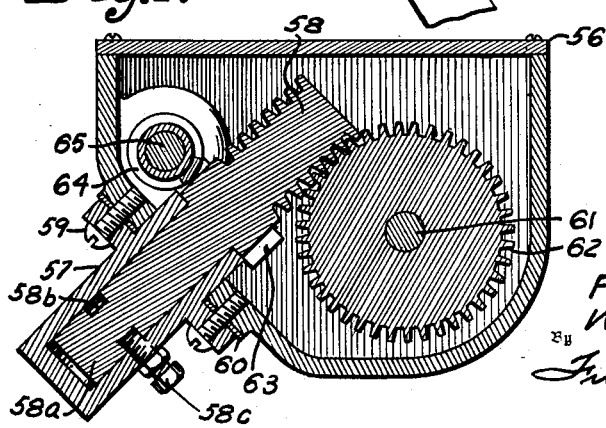

Patented Sept. 28, 1948

2,450,262

UNITED STATES PATENT OFFICE 2,450,262

REVERSING DRIVE MECHANISM

Fred H. Winslow and William S. Hammond, Waco, Tex.

Application May 26, 1947, Serial No. 750,528

17 Claims. (Cl. 74—220)

This invention relates to a reversing drive mechanism for rotating washing machine cylinders or other machines requiring frequent reversals.

The principal object of the present invention is to provide a mechanism whereby the direction of rotation of the washing machine cylinder will be intermittently reversed for facilitating the washing and agitation operation within the drum and to prevent knotting and tangling of the load.

Other objects of the present invention are to provide means for reversing the drive of a drum for washing machines and the like; to provide a shifting device cooperating with belt driven pulleys for reversing the drive of said mechanism; to provide a shifter assembly and idler pulley arrangement adapted to work independently of each other; to provide an idler pulley connected by suitable links with the shifter assembly for alternately reversing said mechanism; to provide means for connecting the shifting mechanism with the main drive shaft of the drum of the washing machine or the like; to provide a reversing mechanism having a worm gear arrangement whereby the same may be set at a predetermined ratio for reversing the mechanism; to provide a cam assembly mounted on the shaft of the reversing unit gear box operable from the main drive shaft; to provide a pull rod for connecting the cam assembly with the shifting mechanism; to provide means for holding the shifter mechanism in either extreme position for the required length of time; to provide means for connecting the shifter mechanism and idler pulley assembly to maintain uniform tension on the belt; and to provide a device of this character simple, economical to manufacture and efficient in operation.

In accomplishing these and other objects of the present invention, we have provided improved details of structure, the preferred form of which is illustrated in the accompanying drawings, wherein:

Fig. 1 is a diagrammatic view of the pulley and belt arrangement showing the shifter pulleys in a position for rotating the drum in one direction.

Fig. 2 is a view similar to Fig. 1 showing the shifter pulleys in a position for rotating the drum in the opposite direction.

Fig. 3 is a longitudinal vertical section through the pulley and shifter mechanism showing the same attached to the drive shaft of a drum for a washing machine or the like.

Fig. 4 is a plan view of the device shown in Fig. 3 with parts broken away to better illustrate the invention.

Fig. 5 is an elevational view of the cam for shifting the shifter pulley assembly.

Fig. 6 is a longitudinal vertical section taken through the shifter assembly and reversing unit gear box.

Fig. 7 is a cross section taken through the gear box particularly illustrating the worm gear and its connection with the large spur gear.

Fig. 8 is an elevational view of the clamping block for retaining the drive gear on the shaft.

Referring more in detail to the drawings:

1 designates a reversing drive mechanism embodying the features of our invention here illustrated to be adapted for use on a washing machine or the like, although the mechanism may be adapted for other purposes.

2 designates a base plate for the washing machine upon which is mounted the tank or washing container 3 by a clamping ring 4. Mounted on the base plate 2 by bolts or the like 5 is a bearing housing 6 for a drive shaft 7 extending through the base plate 2 and into the tank 3 upon which is mounted a drum or washing agitator 8 by a trunnion mounting plate 9, the trunnion and drum arrangement being secured on the end of the shaft 7 by a nut 10. Bearings 11 and 12 are provided for the shaft at the respective ends of the shaft housing 6, and a seal 13 is provided adjacent the bearing 11. A lock nut and washer as indicated at 14 are provided adjacent the bearing 12, and the shaft 7 extends outwardly from the nut upon which is mounted a large main drive gear 15. The driving gear 15 is mounted on the shaft 7 by a clamping block 15a having recessed portions 15b adapted to receive the shanks of screws 16 provided with lock nuts 16a as best illustrated in Fig. 8. The driving gear 15 is provided with ribs 16b for strengthening the gear as is the usual practice.

The outer end of the drive shaft housing 6 is flanged as indicated at 17 (Fig. 3) to which is attached by suitable means a plate 18. Attached to the plate 18 is an oil pan 19 as indicated at 20 (Fig. 3). Bearing housings 21 are secured to the plate 18 by suitable means such as cap screws or the like for supporting gears as later described.

The pan 19 is adapted to contain a lubricant as indicated at 25 in which the gear 15 is adapted to run, and a wiper 26 is attached to the plate 18 by a screw or the like as indicated at 27 (Fig. 3), said wiper contacting the gear and supplying oil to the shaft 7 through an opening 28 in the shaft housing 6.

Mounted upon the supporting plate 18 by welding or the like 30 is a bracket or arm 31 upon which is mounted a supporting plate 32. Mounted upon the plate 32 is a jack shaft 33 having suitable bearing housings 34, the bearing housings being attached to the plate 32 by bolts or the like 35. Located within the housing are suitable bearings (not shown) for the jack shaft.

A motor 38 is mounted on the base plate 2 by suitable brackets 39. The motor has a shaft 40 on which is mounted a drive pulley 41 in alignment with a pulley 42 mounted on one end of the jack shaft 33. Pulleys 41 and 42 are adapted to receive a belt 43 operable by the motor. Mounted on the opposite end of the jack shaft 33 is a drive pulley 44 for a purpose later described.

Carried by the housing 21 is a shaft 45 upon which is mounted a pinion gear 46 adapted to mesh with the large driving gear 15 carried by the main shaft 7. Also carried by the housing 21 is a shaft 47 upon which is a pinion gear 48 also meshing with the large driving or spur gear 15, the pinion gears 46 and 48 being aligned horizontally so as to align with the spur gear 15. The pinion gears are mounted in the housing through suitable bearings as indicated at 49 and 50 (Fig. 4).

Carried by the plate 18 is a reversing unit gear box 56 in which is supported by a sleeved bearing member 57 a combination worm and worm gear 58 having a shank 58a provided with an annular groove 58b adapted to receive the end of a dowel screw 58c extending through an opening in the sleeved bearing member 57 to retain the combination worm and gear member in position. The bearing housing is fastened to the gear box housing by suitable screws or the like 59 (Fig. 7), a gasket 60 being provided between the flanges of the worm gear housing and the gear box, also as illustrated in Fig. 7. Mounted on a shaft 61 within the gear box housing 56 is a worm gear 62 having teeth adapted to engage with the worm gear shaft. Also adapted to engage the teeth 63 of the worm shaft 58 is a worm 64 mounted on a shaft 65 rotatably mounted in the housing 56. The shaft 61 for the gear 62 extends through the gear box housing 56 and carried by the outer end of the shaft is a cam assembly unit 66 for a purpose later described.

Mounted upon the outer ends of the shafts 45 and 47 are main drive pulleys 67 and 68 rotatable with the pinion gears 46 and 48. The shaft 65 extends through the gear box housing 56 and mounted on the outer end of said shaft is a driven pulley 70 operable in alignment with the drive pulley 44.

Mounted upon the base plate by a bracket or the like 71 is an arm 72 pivoted to the bracket as indicated at 73 and adapted to carry an idler pulley 74 on its swinging end by a suitable shaft 75, the idler pulley 74 being mounted in alignment with the drive pulley 44, driven pulley 70 and main drive pulleys 67 and 68, the pulleys being adapted to receive and be driven by a belt 76 as will later be described.

Mounted upon a plate 77 are shifter pulleys 78 and 79. The plate is substantially triangular-shaped, and the pulleys are mounted on opposite corners of the triangle, the vortex of the triangle carrying a link 80 rigidly secured thereto. Pivotally mounted to the opposite end of the link 80 is a rod 81 adapted to telescope in a tubular member or cylinder 82 having one end pivotally mounted to the swinging end of the arm 72 as indicated at 83 (Figs. 1 and 2). The cylinder 82 is provided with a collar 83' movable on the cylinder for adjustment of tension on the spring to compensate for wear or stretch of the belt 76. The shaft 75 of the pulley 74 carries an L-shaped bracket 84, and the pivotal connection of the rod 81 to the link 80 also is provided with a flange member 85. A coil spring 86 is adapted to surround the rod 81 and the tubular member 82, having its respective ends engaging against the bracket flanges 84 and 85 as best illustrated in Fig. 3 to exert a tension on the idler pulley and the link 80 for shifting the plate 77.

A bracket 87 is carried by the flanged end of the shaft housing 6 by bolts or the like 88 (Fig. 3) and carried by the lower end of the bracket is a shaft or rod 89 having a sleeve 90 to which is attached a bracket or arm 91 for supporting a pin 92. Pivotally mounted on the pin 92 is a pull rod 93 having its upper end connected to the reversing unit cam 66. The lower end of the pull rod has a connection 94 comprising a threaded socket adapted to receive a threaded bushing 95 for adjusting the position of the shifter assembly to permit the shifter assembly to swing an equal distance either side of the center line.

The reversing unit cam assembly 66 carried on the shaft 61 from the reversing unit gear box comprises a sleeve 97 engaging over the reduced end 98 of the shaft 61, the sleeve being of sufficient thickness to correspond to the reduced end of the shaft to the size of the enlarged end thereof. Bushings 99 and 100 are provided for bearings 101 and 102 carried by the shaft 61.

Guide bars 103 and 104 are mounted on the bearings 101 and 102 and their outer ends are provided with openings adapted to receive a plurality of bolts or the like 105 having nuts 106. Mounted on the guide bars by the bolts 105 and 106 are crescent-shaped members 107 and 108 providing arcuate trackways 109 and 110. Spacers 111 and 112 are provided between the plates 103 and 104 and the crescent-shaped members to hold said members in place. The crescent-shaped member 107 is connected to the pull rod 93 in any suitable manner such as by welding as illustrated in Figs. 5 and 6.

Also carried by the shafts 61 are plates or arms 113 and 114 spaced on the shafts 61 by a spacer 115. Carried on the outer ends of the arms 113 and 114 by a bearing 116 is a roller 117 adapted to engage the guide tracks 109 and 110 of the crescent-shaped members. A sleeve 118 is provided on the bearing 116 for the roller 117. The cam assembly thus described is retained on the reduced portion 98 of the shaft 61 by a nut 119 engaging the threaded end 120 of the shaft. The cam assembly 66 is connected to the shifter assembly through the pull rod 93. The belt 76 contacts the idler pulley 74 and the shifter pulleys 78 and 79 to alternately contact the belt with the main driving pulleys 67 and 68 as shown in Figs. 1 and 2. The cam assembly 66 is designed so as to hold the shifter assembly in either extreme position for the required length of time, the time being predetermined by ratio of the gear 62 and the worm gears in the gear box.

Operation of the device constructed and assembled as described is as follows:

Operation of the motor 38 will drive the belt 43 over pulleys 41 and 42 causing rotation of the shaft 33 and drive pulley 44, thus driving belts 76 over driven pulley 70 and the main drive pulley 67 when the shifter assembly element is in the position shown in Fig. 1 for the reason that the belt 76 is in contact with the pulley 67. The pinion gear 46 being mounted upon the shaft 45 with the pulley 67 will cause rotation of the pinion gear and the pinion gear being meshed with the spur gear 15 will cause rotation of the spur gear in a clockwise direction to rotate the drum 8 in the washer container 3 by the shaft 7 upon which the spur gear is mounted. With the cam assembly and shifter element in the position shown in Fig. 1, the belt 76 contacts the shifter pulleys 78 and 79, the pulley 79 holding the belt in contact with the drive pulley 67.

When the mechanism is in the position shown in Fig. 1 the pull rod is in down position and the cam assembly is in the position shown in Fig. 5. The belt 76 drives the pulley 70 carried on the shaft 65 which has a worm connecting with the worm drive 58 to rotate the gear 62 carried by the shaft 61 in the gear box 56. Rotation of the gear 62 with its shaft will cause the roller 117 carried by the plates 113 and 114 to roll on the trackways 109 and 110 of the crescent-shaped members 107 and 108 until the roller passes the point 121 of the crescent-shaped member 107 and then contacts the point 122 of the crescent-shaped member 108, and movement on the track 110 of this member will cause pull on the rod 93 through the shifter assembly. The pull on the rod 93 will exert a pressure on the triangular-shaped plate 77 causing pivoting of the link 80 on the spring tension telescoping rod 81 and will cause shifting of the shifter pulleys 78 and 79 to the right as shown in Fig. 2, thus causing the belt 76 to release its contact with the pulley 67 and contact pulley 68 to rotate the shaft 47 carrying the pinion gear 48, the pulley 78 holding the belt 76 in contact with pulley 68. As the pinion 48 contacts the spur gear 15 to rotate the gear in an anticlockwise direction, the direction of rotation of the drum in the washing tank will be reversed.

It will thus be seen that when the roller 117 reaches the extremity of the crescent-shaped member 107, it engages the opposite crescent-shaped member 108 to move the whole assembly through the normal travel and then again holds the assembly in this extreme position until the travel has been completed. A linkage between the lower idler and shifter assembly is such that a practically constant belt tension is maintained throughout the entire travel of the shifter assembly.

While we have here illustrated a spring type link, it will be obvious that a rigid link could be substituted with means for adjustment, such as a turnbuckle. In connecting the two assemblies any pull by the belt on the two units will be neutralized.

It will be obvious that instead of the cam arrangement a crank or eccentric can be used without departing from the scope of the appended claims.

It will be obvious from the foregoing that we have provided an improved shifter reversing mechanism operable by a cam assembly and shifter element which is simple and efficient in operation. It will further be obvious that we have here illustrated the pulleys having V-shaped grooves adapted to receive V-shaped belts, but it will be obvious that flat or other type belts may be used.

It is also obvious that chains, belts or other form of drive may be substituted for the gear 15 and pinions 46 and 48. It should be noted also that by varying the size of pinions 46 and 48 a quick return drive could be produced.

What we claim and desire to secure by Letters Patent is:

1. A driving and reversing mechanism for washing machines or the like having an agitator shaft mounted on a base plate comprising, a spur gear on said shaft, a countershaft, means for rotating said countershaft constantly in one direction, a drive pulley mounted on the countershaft and rotatable therewith, a pair of short shafts, pinion gears on said short shafts adapted to engage said spur gear, main driving pulleys mounted on said short shafts in alignment with the driving pulley on the countershaft, an idler pulley pivotally mounted on said base plate in alignment with the main driving pulleys and the driving pulley on the countershaft, and a belt for said driving and idler pulleys, said belt being adapted to alternately contact said main driving pulleys.

2. A driving and reversing mechanism for washing machines or the like having an agitator shaft mounted on a base plate comprising, a spur gear on said shaft, a countershaft, means for rotating said countershaft constantly in one direction, a drive pulley mounted on the countershaft and rotatable therewith, a pair of short shafts, pinion gears on said short shafts adapted to engage said spur gear, main driving pulleys mounted on said short shafts in alignment with the driving pulley on the countershaft, an idler pulley pivotally mounted on said base plate in alignment with the main driving pulleys and the driving pulley on the countershaft, a belt for said driving and idler pulleys, said belt being adapted to alternately contact said main driving pulleys, and means for shifting said belt from one of said main driving pulleys to the other whereby said spur gear will be alternately driven in one direction or the other.

3. A driving and reversing mechanism for washing machines or the like having an agitator shaft mounted on a base plate comprising, a spur gear on said shaft, a countershaft, means for rotating said countershaft constantly in one direction, a drive pulley mounted on the countershaft and rotatable therewith, a pair of short shafts, pinion gears on said short shafts adapted to engage said spur gear, main driving pulleys mounted on said short shafts in alignment with the driving pulley on the countershaft, an idler pulley pivotally mounted on said base plate in alignment with the main driving pulleys and the driving pulley on the countershaft, a belt for said driving and idler pulleys, said belt being adapted to alternately contact said main driving pulleys, and cam means for shifting said belt from one of said main driving pulleys to the other whereby said spur gear will be alternately driven in one direction or the other.

4. A driving and reversing mechanism for washing machines or the like having an agitator shaft mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, an idler pulley pivotally mounted on said base plate in alignment with the main driving pulleys and the driving pulley on the countershaft, a pair of shifter pulleys, means for mounting said shifter pulleys in alignment with the main driving pulleys, said means having connection with said shifter pulley mounting, and a belt for said driving, idler and shifter pulleys, said belt being adapted to alternately contact said main driving pulleys.

5. A driving and reversing mechanism for washing machines or the like having an agitator shaft mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, an idler pulley pivotally mounted on said base plate in alignment with the main driving pulleys and the driving pulley on the countershaft, a pair of shifter pulleys, means for mounting said shifter pulleys in alignment with the main driving pulleys having connection with said shifter pulley mounting, a belt for said driving, idler and shifter pulleys, said belt being adapted to alternately contact said main driving pulleys, and means connected to the mounting of said shifter pulleys for shifting said belt from one of said main driving pulleys to the other whereby said main driving gear will be alternately driven in one direction or the other.

6. A driving and reversing mechanism for washing machines or the like having an agitator shaft mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, an idler pulley pivotally mounted on said base plate in alignment with the main driving pulleys and the driving pulley on the countershaft, a pair of shifter pulleys, means pivotally mounting said shifter pulleys in alignment with the main driving pulleys, said means having spring tensioned connection with said shifter pulley mounting, a belt for said driving, idler and shifter pulleys, said belt being adapted to alternately contact said main driving pulleys, and means connected to the mounting of said shifter pulleys for shifting said belt from one of said main driving pulleys to the other whereby said main driving gear will be alternately driven in one direction or the other.

7. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts adapted to engage said main driving gear, main driving pulleys mounted on said short shafts in alignment with the driving pulley on the countershaft, an idler pulley pivotally mounted on said base plate in alignment with said pulleys, a gear box mounted on said base plate having a shaft for mounting a worm gear, a worm mounted in said gear box, a second shaft in said gear box, a pulley operable by said worm in said gear box, said last named pulley being in alignment with the main driving pulleys, a shifter element mounted on said agitator shaft housing, means connecting said shifter element with said idler pulley mounting, and a belt for said pulleys, said belt being adapted to alternately contact said main driving pulleys.

8. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts adapted to engage said main driving gear, main driving pulleys mounted on said short shafts in alignment with the driving pulley on the countershaft, an idler pulley pivotally mounted on said base plate in alignment with said pulleys, a gear box mounted on said base plate having a shaft for mounting a worm gear, a worm mounted in said gear box, a second shaft in said gear box having a pulley operable by said worm in said gear box, said last named pulley being in alignment with the main driving pulleys, a shifter element mounted on said agitator shaft housing, means connecting said shifter element with said idler pulley mounting, a belt for said pulleys, said belt being adapted to alternately contact said main driving pulleys, and means connected with said shifter element operable from the gear box for shifting said belt from one of said main driving pulleys to the other whereby said main driving gear will be alternately driven in one direction or the other.

9. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts adapted to engage said main driving gear, main driving pulleys mounted on said short shafts in alignment with the driving pulley on the countershaft, an idler pulley pivotally mounted on said base plate in alignment with said pulleys, a gear box mounted on said base plate having a shaft for mounting a worm gear, a worm mounted in said gear box, a second shaft in said gear box having a pulley operable by said worm in said gear box, said last named pulley being in alignment with the main driving pulleys, a shifter element mounted on said agitator shaft housing, said element including shifter pulleys, means connecting said shifter element with said idler pulley mounting, a belt for said pulleys, said belt being adapted to alternately contact said main driving pulleys, and means connected with said shifter element operable from the gear box for shifting said belt from one of said main driving pulleys to the other whereby said main driving gear will be alternately driven in one direction or the other.

10. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts adapted to engage said main driving gear, main driving pulleys mounted on said short shafts in alignment with the driving pulley on the countershaft, an idler pulley pivotally mounted on said base plate in alignment with said pulleys, a gear box mounted on said base plate having a shaft for mounting a worm gear, a worm mounted in said gear box, a second shaft in said gear box having a pulley operable by said worm in said gear box, said last named pulley being in alignment with the main driving pulleys, a shifter element mounted on said agitator shaft housing, said element including shifter pulleys, means connecting said shifter element with said idler pulley mounting, a belt for said pulleys, said belt being adapted to alternately contact said main driving pulleys, and a cam assembly operable by said worm gear in said gear box having connection with said shifter element for shifting said belt from one of said main driving pulleys into the other whereby said main driving gear will be alternately driven in one direction or the other.

11. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts adapted to engage said main driving gear, main driving pulleys mounted on said short shafts in alignment with the driving pulley on the countershaft, an idler pulley pivotally mounted on said base plate in alignment with said pulleys, a gear box mounted on said base plate having a shaft for mounting a worm gear, a worm mounted in said gear box, a second shaft in said gear box having a pulley operable by said worm in said gear box, said last named pulley being in alignment with the main driving pulleys, a shifter element mounted on said agitator shaft housing, said element including shifter pulleys, means connecting said shifter element with said idler pulley mounting, a belt for said pulleys, said belt being adapted to alternately contact said main driving pulleys, and a cam assembly operable by said worm gear in said gear box having pivotal connection with said shifter element and said idler pulley mounting for shifting said belt from one of said main driving pulleys into the other whereby said main driving gear will be alternately driven in one direction or the other.

12. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, an idler pulley pivotally mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in said gear box and having connection with the shifter element whereby movement of said shifter element will cause said belt to alternately contact said main driving pulleys to alternately drive the main driving gear in one direction or the other.

13. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, shifter pulleys mounted on said shifter element, an idler pulley pivotally mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in the gear box and having connection with the shifter element whereby movement of said shifter pulleys will cause said belt to alternately contact said main driving pulleys upon operation of the cam assembly unit.

14. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, shifter pulleys mounted on said shifter element, an idler pulley pivotally mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in the gear box and having a pull rod pivotally connected to the shifter element whereby said shifter pulleys will cause said belt to alternately contact said main driving pulleys upon operation of said pull rod by the cam assembly unit.

15. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, shifter pulleys mounted on said shifter element, an idler pulley pivotally mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in the gear box, said cam assembly unit including spaced plates mounted on the shaft in the gear box, members forming oppositely facing trackways secured to said plates, a guide member secured between said plates, arms on said guide member, a roller carried by said arms engaging said trackway, and means secured to one of said members forming oppositely facing trackways and to said shifter element whereby movement of the roller on said trackways will cause shifting of the belt to alternately contact said main driving pulleys to drive said main driving gear in one direction or the other.

16. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, shifter pulleys mounted on said shifter element, an idler pulley pivotaly mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in the gear box, said cam assembly unit including spaced plates mounted on the shaft in the gear box, members forming oppositely facing trackways secured to said plates, a guide member secured between said plates, arms on said guide member, a roller carried by said arms engaging said trackway, and a pull rod secured to one of said members forming oppositely facing trackways and to said shifter element whereby movement of the roller on said trackways will cause shifting of the belt to alternately contact said main driving pulleys to drive said main driving gear in one direction or the other.

17. A driving and reversing mechanism for washing machines or the like having an agitator shaft and housing therefor mounted on a base plate comprising, a main driving gear on said shaft, a countershaft, means for rotating said countershaft constantly in one direction, a drive pulley mounted on the countershaft and rotatable therewith, a pair of short shafts, pinion gears on said short shafts and adapted to engage said main driving gear, main driving pulleys mounted on said short shafts in alignment with the driving pulley on the countershaft, a shifter element carried by said agitator shaft housing, shifter pulleys mounted on said shifter element, an idler pulley pivotally mounted on said base plate, tensioning means pivotally connecting said idler pulley mounting with the shifter element, a gear box, a worm shaft mounted in said gear box, a worm gear on said shaft, a shaft having teeth connected with said worm shaft, a pulley on said last named shaft in alignment with said main driving pulleys, and a cam assembly unit operable by the gear in the gear box, said cam assembly unit including spaced plates mounted on the shaft in the gear box, members forming oppositely facing trackways secured to said plates, a guide member secured between said plates, arms on said guide member, a roller carried by said arms engaging said trackway, and a pull rod rigidly secured to one of said members forming oppositely facing trackways and pivotally connected to said shifter element whereby movement of the roller on said trackways will cause shifting of the belt to alternately contact said main driving pulleys to drive said main driving gear in one direction or the other.

FRED H. WINSLOW.
WILLIAM S. HAMMOND.

No references cited.